United States Patent
Conigliaro et al.

(10) Patent No.: US 6,775,594 B1
(45) Date of Patent: Aug. 10, 2004

(54) METHOD FOR RANKING AND DISPATCHING ELECTRICAL GENERATION SYSTEMS OVER A COMPUTER NETWORK

(75) Inventors: James P. Conigliaro, Greendale, WI (US); Jeffrey S. Zingsheim, Oak Creek, WI (US)

(73) Assignee: Engage Networks, Inc., Milwaukee, WI (US)

( * ) Notice: Subject to any disclaimer, the term of this patent is extended or adjusted under 35 U.S.C. 154(b) by 87 days.

(21) Appl. No.: 10/050,340

(22) Filed: Jan. 16, 2002

Related U.S. Application Data

(60) Provisional application No. 60/261,842, filed on Jan. 16, 2001.

(51) Int. Cl.[7] .......................... G05B 13/02; G06F 19/00
(52) U.S. Cl. .......................... 700/287; 700/50; 700/297; 706/907
(58) Field of Search .......................... 700/50, 286–288, 700/297, 298; 706/907, 915

(56) References Cited

U.S. PATENT DOCUMENTS

| | | | | |
|---|---|---|---|---|
| 4,604,714 A | * | 8/1986 | Putman et al. | 700/288 |
| 5,159,562 A | * | 10/1992 | Putman et al. | 700/288 |
| 5,621,654 A | * | 4/1997 | Cohen et al. | 700/287 |
| 5,625,751 A | * | 4/1997 | Brandwajn et al. | 706/20 |
| 5,949,153 A | * | 9/1999 | Tison et al. | 307/29 |
| 2002/0023044 A1 | * | 2/2002 | Cichanowicz | 705/37 |
| 2002/0089234 A1 | * | 7/2002 | Gilbreth et al. | 307/80 |

OTHER PUBLICATIONS

Cox, Earl, "The Fuzzy System Handbook: A Practitioner's Guide to Building, Using and Maintaining Fuzzy Systems", Second Edition, c. 1999, Academic Press, Chestnut Hill, MA, various pages cited.*

* cited by examiner

*Primary Examiner*—Leo Picard
*Assistant Examiner*—Elliot L. Frank
(74) *Attorney, Agent, or Firm*—Michael Best & Friedrich LLP

(57) ABSTRACT

A method of dispatching a plurality of electrical generation systems that are controlled by a central monitoring and control system. The central system determines the order in which the distributed generators are deployed based upon several variables, such as maintenance costs, operating costs, and operating performance. The determination of the start order is based upon a significant number of variables that vary from one make and model of generator to another. The system and method of the present invention utilizes fuzzy logic to determine the order in which the generators are dispatched based upon the multiple variables available.

13 Claims, 3 Drawing Sheets

METHOD FOR RANKING AND DISPATCHING ELECTRICAL GENERATION SYSTEMS OVER A COMPUTER NETWORK

CROSS-REFERENCE TO RELATED APPLICATION

The present invention is based on and claims priority to U.S. Provisional Patent Application No. 60/261,842, filed Jan. 16, 2001.

BACKGROUND OF THE INVENTION

The present invention relates to the dispatch of a plurality of electrical generation systems accessible over a computer network. More specifically, the invention is directed towards those generation systems classified as "distributed generators", or "distributed resources" that can be remotely monitored and activated by a central controller over a global computer network. For the purposes of this disclosure, a distributed generator/resource is any small-scale electricity-generating device producing maximum power of less than 20 MW as defined in decision 99-10-065 of the Public Utilities Commission of the State of California.

Presently, in some states in the United States, the demand for electricity at given times during the year exceeds the present capacity of the electric utility provider within the given area. The lack of energy capacity can result in brown-outs or blackouts in these areas. In response to this problem, distributed generation resources can be connected to the power grid to provide supplemental energy resources at times of high demand. Typically, the distributed generation resources are capable of being remotely monitored and activated by the utility or other controlling agent.

As distributed generation resources are being widely deployed and used in the modern energy markets, there is a need to deploy large groups of generators that may be of a wide variety of makes and models. The order in which the generators are started and begin generating power will have an effect on maintenance costs, operating costs, and performance. The determination of start order is based upon a significant number of variables that vary from one make and model of generator to another. Thus, there is a need to determine the order in which to dispatch a plurality of generators that takes into account multiple variables in the decision making process.

Decision-making is a process that lends itself to a series of rules. These rules are classically implemented using a series of if-then statements. While these rules are effective for go/no-go decisions, ordering and ranking based upon multiple variables proves to be a task too complicated to effectively implement using classic programming techniques. Ranking is a somewhat simple task if only one variable is being accounted for. However, appropriate ordering becomes ambiguous if multiple factors are being considered. Historically, either simple, single variable sorting has been used or complex, non-editable equations were used to determine the order in which generators were to be started. Both of these methodologies have drawbacks. Single variable sorting ignores most variables in what is in actuality a very complex decision. The use of non-editable equations requires an expert to create a mathematical relationship between input variables and sort order. This method is not updateable and requires different equations for different generator types and will not accurately sort generators of different makes and models.

Therefore, a need exists for a system and method for determining the order in which distributed generation resources are deployed that takes into account multiple ranking variables in an automated and efficient manner. Further, a need exists for a method of initiating the activation of distributed generation resources that can be modified according to revised parameters without requiring entirely new equations and determination factors.

SUMMARY OF THE INVENTION

The present invention relates to a system and method for dispatching a plurality of distributed electrical generation systems that are accessible over a computer network. A central computer controller monitors each of the distributed generation systems and initiates operation of each generation system based upon the current ranking of the generation system relative to the other generation systems. The ranking of each system is based upon multiple variables received by the central controller. Based upon these multiple input variables, the central controller utilizes a series of predefined linguistic rules to rank each of the generators and start the generators based upon the ranking order.

The ranking and dispatch system of the present invention is able to account for an unlimited number of parameters and input variables in the ranking process. Further, the ranking and dispatch system of the present invention works for any combination of generator makes and models, since each make and model has its own specific set of rules to define the ranking order. Further, the ranking and dispatch system of the present invention does not require knowledge of system mathematics to configure and generate the ranking order.

The ranking and dispatch system of the present invention utilizes a fuzzy logic engine to perform approximate reasoning. Approximate reasoning implements a series of rules in the form of "if-then" statements. For example, a rule implemented in accordance with the present invention may be "If run time hours are high and fuel costs are high, then rank is low."

Before the ranking and dispatch system can generate a ranking, the linguistic variables must first be set. In a generator dispatch system, fuel volume, run time hours, fuel costs, operating efficiency and other important operating characteristics can be set as the linguistic variables for the system. The linguistic variables can vary for each type of generator.

After the linguistic variables are determined, the terms and hedges are set for each variable. Typically, terms such as high, medium and low are used for each of the linguistic variables, such that the variables can be classified easily.

After the terms and hedges have been set, the consequent linguistic variable is determined. In the present invention, the consequent linguistic variable is "rank" and includes the terms "high", "medium", "low". Thus, once the rules are defined, the result is that the consequent variable rank is either high, medium or low.

With the terms and hedges, consequent linguistic variable and input variables set, the user enters various rules into the ranking and dispatch system. These rules are typically "if-then" statements that relate the variables to a rank. As indicated, one rule could be: If run time hours are high and fuel cost is high, then rank is low.

Once the rules have been set, the input data is normalized. With the data normalized, approximate or fuzzy reasoning is applied to each item to be ranked. As indicated, the normalized data is then entered into one of the rules and the consequent linguistic variable rank is determined to be either high, medium or low. Once this variable for the ranking has been set, the various generators are ordered from highest rank to lowest rank.

In accordance with the ranking and dispatch system of the present invention, the rules are not limited to the number of variables (antecedent terms), nor does the system limit the number of rules that may be used to determine rank. Thus, the system is capable of handling any number of input parameters.

Because approximate reasoning implements representations of linguistic rules, the mathematics of the system may remain transparent from the users. Users need only to establish a set of linguistic rules for each make and model of the generator.

Once the various generators are ranked, the computerized control system initiates activation of each generator based upon the ranking. In this manner, the computerized controller is able to effectively activate the most preferred generator prior to activation of less preferred generators.

The methodology of the present invention is to be implemented with an n-tier thin client architecture in which the variables and rules are configured through a web interface communicating with compiled business logic components on a central server. The rules are to be stored in a database residing on the server or servers. The process of data normalization and ranking will be performed within a business logic tier. Generators may then be dispatched using a communication engine to directly communicate with the distributed resources over a network, either local or wide area.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
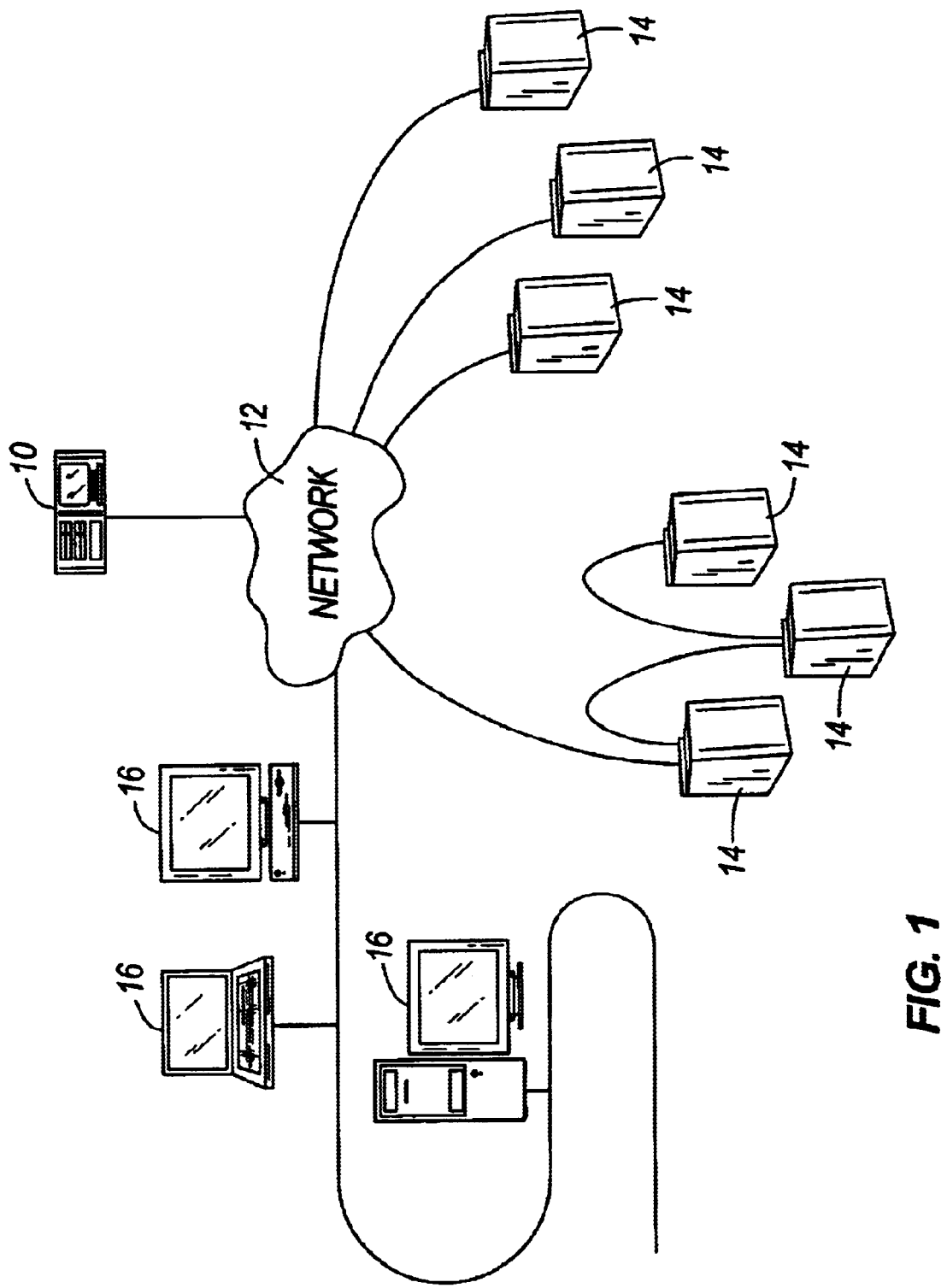
FIG. 1 is a schematic illustration of multiple distributed energy generators accessible over a computer network.

FIG. 1 illustrates a portion of an energy management system in which a central computer controller 10 is able to monitor energy consumption information over a computerized network 12. In the preferred embodiment of the invention, the global computer network 12 is the Internet, although other types of computer networks can be found to fall within the scope of the present invention.

As illustrated in FIG. 1, multiple distributed generators 14 are connected to the network 12. In the preferred embodiment of the invention, each of the distributed generators 14 can be started and shut down by the computer controller 10 over the network 12. In addition to the distributed generators 12, a series of web browser clients 16 are connected to the network 12 to monitor the operation of the distributed generators 14 as well as other components connected to the network 12.

As illustrated in FIG. 1, each of the generators 14 is connected to the network 12 and includes a unique address such that the generators 14 can be started independently by the central controller 10. The present invention focuses on the order in which each of the distributed generators 14 are started by the central controller 10, as will be described in greater detail below.

Decision-making is a process that lends itself to a series of rules. These rules are classically implemented using a series of if-then statements. While these rules are effective for go/no-go decisions, ordering and ranking based upon multiple variables proves to be a task too complicated to effectively implement using classic programming techniques. Ranking is a somewhat simple task if only one variable is being accounted for. However, appropriate ordering becomes ambiguous if multiple factors are being considered. A solution is needed that can provide rank based upon multiple variables in an automated and efficient fashion.

Historically expert systems have been used to solve complex problems. However, because these first generation systems do not accurately represent the human thought process, they often fall short of expectations.

Data Preparation

Generally, pre-processing data is considered the key to successful implementation of an intelligent system. The implementation of a fuzzy ranking and ordering system in accordance with the present invention is no exception. To properly apply a fuzzy system to a general case, the input variables must first be normalized. Furthermore, if the items to be ranked are to be judged relative to one another, normalization must take place relative to the respective input spaces of the variables.

Each instance of an input variable must be normalized in relation to the variables input space. Thus, an input $a_i$ must be normalized in relation to A where $$A \equiv \bigcup_{i=1}^{n} a_i.$$

There are several approaches to normalization in relation to input space. An input may be normalized using the maximum value of A.

$$\tilde{a}_i = \frac{a_i}{\max(A)}. \tag{1}$$

The normalized input space now becomes:

$$\tilde{A} \in (-\infty, 1]. \tag{2}$$

Because of the infinite lower bound, this method of normalization is often undesirable unless the input space is always guaranteed to fall within certain predefined limits.

An input may be normalized using the average of the input space.

$$\tilde{a}_i = \frac{a_i}{\langle A \rangle}. \tag{3}$$

The normalized input space now becomes:

$$\tilde{A} \in (-\infty, \infty). \tag{4}$$

At first inspection, this form of normalization appears to be less desirable than normalizing by the maximum; however, closer inspection will reveal that:

$$\langle \tilde{A} \rangle = 1. \quad (5)$$

The mean of the input space is now a known quantity, which is a desirable result of normalization.

A third approach to normalization is to normalize based upon the span of the input space. Thus $$\tilde{a}_i = \frac{a_i - \langle A \rangle}{span(A)} \quad (6)$$

The normalized input space now becomes:

$$\tilde{A} \in [-1,1]. \quad (7)$$

The normalized input space is now a fully bounded space centered about the origin. In many cases, this is the most desirable result of normalization. In the preferred embodiment of the invention, the inputs will be normalized using this technique, however the other techniques of normalization discussed above can be implemented depending upon circumstances and would fall within the scope of the present invention.

Fuzzy Set and Approximate Reasoning

Figure 2:
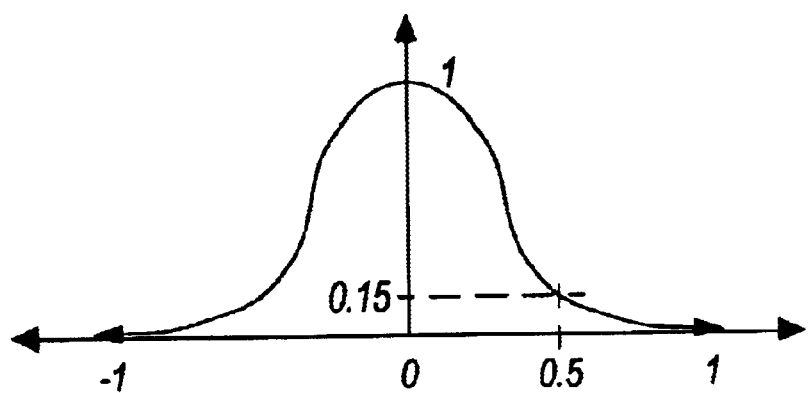
FIG. 2 is a graphic illustration of the member function of a fuzzy set defined as numbers around zero.

Fuzzy sets eliminate the sharp boundaries inherent in Boolean (crisp) sets and thus introduce a certain degree of vagueness. However, the vagueness of fuzzy systems allows the fuzzy system to make very precise decisions. When analyzing an input, the concern is with degree of belonging or membership to a fuzzy set. For example, if a fuzzy set is defined to be those numbers around zero, its membership function may appear similar to the curve in FIG. 2. In FIG. 2, the horizontal axis corresponds to the input, while the vertical axis represents the degree of membership. An input of 0.5 would have a degree of membership of 0.15, while an input of 0.0 would have a degree of membership of 1.0.

A membership function may be any function f(x) such that:

$$f(x) = \{0,1\} \forall x. \quad (8)$$

The membership function f(x) may be continuous or piecewise defined. A typical piecewise defined membership function is the triangular membership function.

$$f(x) = \begin{cases} 0 & : x < a; x \geq c \\ \frac{(x-a)}{(b-a)} & a \leq x < b \\ \frac{(c-x)}{(c-b)} & b \leq x < c \end{cases} ; a < b < c \in \mathbb{R}. \quad (9)$$

A popular continuous membership function is the Gaussian membership function.

$$f(x) = e^{-\left(\frac{x-\lambda}{\sigma}\right)^2} \quad (10)$$

where x is the input, $\lambda$ is the maximum boundary limit and $\sigma$ is the minimum boundary limit.

Linguistic Variables

Figure 3:
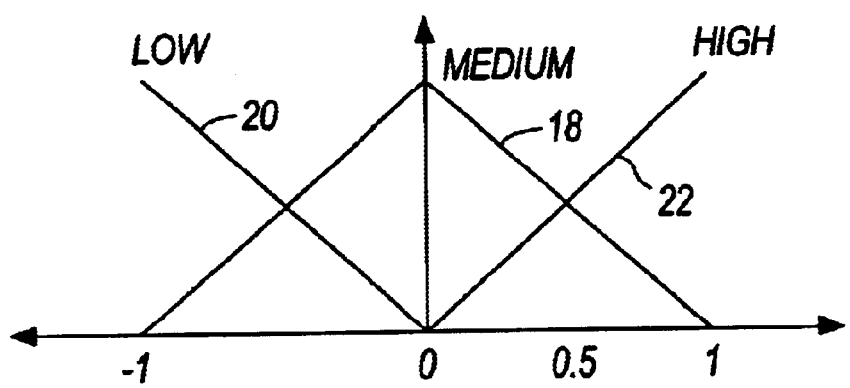
FIG. 3 is a graphic illustration showing the terms for a linguistic variable.

A linguistic variable is a variable represented by words or sentences, such as temperature, speed, or sharpness. The linguistic variable is then broken into a set of terms. For example, temperature may be broken into the terms "high temperature", "medium temperature", and "low temperature". FIG. 3 illustrates the terms for the linguistic variable "normalized temperature", where the triangle line 18 represents the medium temperature function, the downwardly sloping line 20 represents the low temperature function and the upwardly sloping line 22 represents the high temperature function.

The idea that a variable can belong to multiple terms at once is critical to the understanding of approximate reasoning. For example, a normalized temperature of 0.5 belongs equally to the medium and high terms. This uncertainty is used to build a complex set of rules for approximate reasoning.

Fuzzy logic specifies that terms of a linguistic variable may be modified. The modifiers are referred to as hedges. Examples of a linguistic hedge are terms such as very, slightly and fairly. Hedging is performed by modifying the degree of membership. Common hedges include:

TABLE 1

| Common Hedges | |
|---|---|
| Very | $\theta^2$ |
| Highly | $\theta^3$ |
| Fairly | $\theta^{0.5}$ |
| Roughly | $\theta^{0.25}$ |
| Rather | max (fairly, not fairly) |
| Not | $1-\theta$ |

Qualitative Reasoning

Linguistic variables and terms are utilized to draw conclusions using qualitative reasoning. The terms are combined into if-then statements such as:

If temperature is high and humidity is low than discomfort is medium.

If temperature is very high and humidity is medium than discomfort is high.

Figure 5:
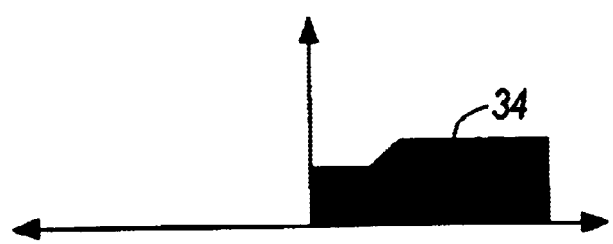
FIG. 5 is an illustration of the membership functions combined utilizing the additive implication rule producing a solution fuzzy region.
Figure 4:
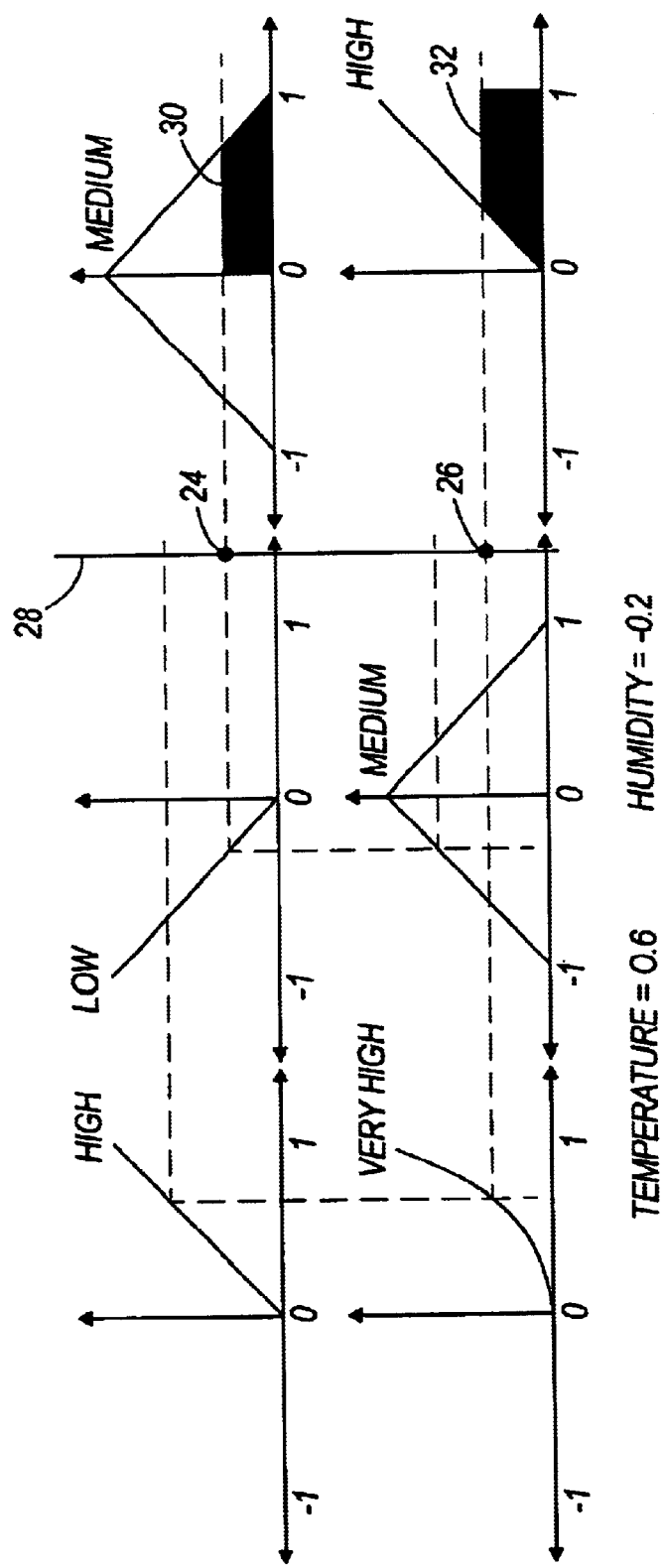
FIG. 4 is a graphic illustration of the implementation of a pair of linguistic variables.

Each sentence has a predicate and a consequent. The predicates in the above rules are "If temperature is high and humidity is low" and "If temperature is very high and humidity is medium" respectively. The consequent clauses are "discomfort is medium" and "discomfort is high" respectively. The implementation of these rules is represented graphically in FIG. 4. The normalized input temperature of 0.6 and the normalized input humidity of -0.2 are applied to their respective predicate membership functions. The AND operation is implemented using the MIN rule of composition, as illustrated by the respective points 24 and 26 on line 28. The membership functions in the predicate are truncated, as shown by shaded areas 30 and 32 in FIG. 4 and then combined utilizing the additive implication rule producing the solution fuzzy region 34 shown in FIG. 5. This process is known as the MIN-MAX rule of composition Once a solution fuzzy region is determined, the region must be transformed into a crisp output. The method most widely accepted for this defuzzification process is the composite moment method. Let F(x) represent the solution fuzzy region. The composite moment is computed as:

$$z = \frac{\int_x F(x) x \, dx}{\int_x F(x) \, dx} \quad (11)$$

which may be approximated as:

$$z = \frac{\sum_{i=0}^{n} x_i F(x_i)}{\sum_{i=0}^{n} F(x_i)}. \quad (12)$$

This technique was first developed for control applications but has proven effective in a number of other areas.

Fuzzy Ranking and Ordering

Once the fundamentals of approximate reasoning are understood, they may be used for ranking and ordering. The process is straightforward.

In the beginning of the process, the linguistic variables used in the ranking and ordering system must be defined. In the present invention, the linguistic variables are related to the relevant monitored data from the multiple distributed generators that may affect the decision to start one generator over another generator. For example, three common variables would be the number of run time hours the particular generator has already incurred, the volume of fuel within the generator at the specific time the determination to start the generator is made, and the current fuel costs relative to the cost of providing electricity by some other means. Although these three variables are often used in determining whether to start a distributed generator, various other variables could be used while operating in the scope of the present invention.

After the linguistic variables have been determined, the next step is determining the terms for each of the variables. For example, the run time hours could be classified as either high, medium, or low. Likewise, the fuel volume could be classified as either full, medium, or empty. Finally, the fuel costs could be determined to be high, average, or low.

In addition to setting the terms to be used in the ranking and ordering system, various hedges can also be set into the system. As described previously, the hedges are used to modify each of the defined terms. A typical hedge would be if the fuel cost is very high or very low.

Once the hedges and terms have been set and the linguistic variables defined, the consequent linguistic variables are defined such that they can be ranked. In the case of the distributed generation assets connected to the computer network, the linguistic variables are used to define a consequent linguistic variable called "rank" that can be either high, medium, or low. In the present invention, hedges are not used to modify the "rank" linguistic variable, but could be used if desired.

Once the variables have been defined, various rules are entered into the system. For example, a rule could be defined as "if the run time hours is high and the fuel volume is low, then rank is low." As can be understood, various rules can be created depending upon the variables used for each of the distributed generators. An advantage of the present system is that each of the rules are entered as linguistic statements that can be easily understood by persons operating the system.

Once the rules have been defined, the current data received from the generator is normalized using one of the normalization functions described previously. As described, the input data is normalized to fall between 0 and 1 based upon the membership function.

After the input data is normalized, the defined rules are used to provide a ranking for each item. This implication step is used to generate the ranking for each variable based upon the predefined rules.

After the items have been ranked, they are ordered from the highest composite moment to the lowest composite moment. The highest composite moment indicates the generator that should be started first, while the lowest composite moment indicates the generator that should be started last.

As discussed above, the terms typically selected for use in implementing the fuzzy ranking and ordering system are: high, medium and low. However, these terms can be modified for the particular type of input being analyzed. Additionally, although hedging is described as being used, hedging is an optional step. Although hedges can add precision to the final calculation, hedging inserts an additional component into the processing step and results in a more complex computation. Once the rules have been set for the various inputs, the final set of rules needs to be carefully examined to ensure that mistakes are not present. Mistakes that result in conflicting rules can completely invalidate the entire ranking and ordering system.

As can be understood above, data normalization is essential for a stable system. Because ranking and ordering is primarily concerned with the similarity of comparisons, it is best to normalize the data to the input spans.

Application Example—Ranking Generators of a Single Type

The problem of determining the order to start generators is examined in this example. The general goal is to rank the generators in the order in which they should be started based upon the variables run time hours, fuel volume and fuel costs. Once again, these three variables are selected for an illustrative purpose only, and other variables could replace these variables, or be added as desired.

Based upon these three variables, the rules are divided into three terms (high, medium and low). With these three terms and variables, the following set of rules is applied to the system:

1. If (Run Time Hours is High) then (Rank is Low)
2. If (Run Time Hours is Low) then (Rank is High)
3. If (Fuel Volume is Low) then (Rank is Low)
4. If (Fuel Volume is High) then (Rank is High)
5. If (Fuel Cost is High) then (Rank is Low)
6. If (Fuel Volume is High) and (Fuel Cost is Low) then (Rank is High)

The following table defines the data relevant to the ranking problem

TABLE 2

Generator Data

| Generator | Runtime (hours) | Fuel Volume (%) | Fuel Cost ($) |
|---|---|---|---|
| 1 | 143 | 98 | 0.32 |
| 2 | 544 | 54 | 0.11 |
| 3 | 943 | 10 | 0.45 |
| 4 | 1023 | 99 | 0.32 |
| 5 | 45 | 40 | 0.48 |
| 6 | 1532 | 75 | 0.21 |

The data is then normalized to produce the following table

TABLE 3

Normalized Generator Data

| Generator | Runtime Hours | Fuel Volume (%) | Fuel Cost |
|---|---|---|---|
| 1 | 0.065904506 | 0.988764045 | 0.567567568 |
| 2 | 0.335574983 | 0.494382022 | 0 |

TABLE 3-continued

Normalized Generator Data

| Generator | Runtime Hours | Fuel Volume (%) | Fuel Cost |
|---|---|---|---|
| 3 | 0.603900471 | 0 | 0.918918919 |
| 4 | 0.657700067 | 1 | 0.567567568 |
| 5 | 0 | 0.337078652 | 1 |
| 6 | 1 | 0.730337079 | 0.27027027 |

Running the normalized data through the fuzzy system produces the following results:

TABLE 4

Generator Ranking

| Generator | Rank | Order |
|---|---|---|
| 1 | 0.79468 | 1 |
| 2 | 0.6662 | 2 |
| 3 | 0.15745 | 6 |
| 4 | 0.5084 | 3 |
| 5 | 0.2601 | 5 |
| 6 | 0.49857 | 4 |

As Table 4 indicates, the fuzzy implication network and ranking system of the present invention utilizes the multiple rules and ranking orders to determine that generator 1 should be started before any of the other generators attached to the energy system. After generator 1 has been started, generator 2 and 4 should be started next, in that order. As can be understood, the system of the present invention utilizes multiple inputs to rank the generators and start the generator that is most desirable based upon the three variables. In this manner, the simple linguistic statements and variables can be used to generate what would otherwise have been a complicated decision.

Ranking Generators of Multiple Types

The problem of determining the order to start generators of multiple types is examined in this example. The fact that the generators are divided into two distinct types complicates the problem because different generator types must follow different rules for ranking. However, the entire set of generators must still be ranked in relation to the whole. The variables affecting generator type A are run time hours, fuel volume and fuel cost.

The variables relevant to generator type B are run time hours, efficiency rating and fuel cost.

Each of these rules is divided into three terms (High, Medium and Low). The following set of rules is applied to generators of type A:

1. If (Run Time Hours is High) then (Rank is Low)
2. If (Run Time Hours is Low) then (Rank is High)
3. If (Fuel Volume is Low) then (Rank is Low)
4. If (Fuel Volume is High) then (Rank is High)
5. If (Fuel Cost is High) then (Rank is Low)
6. If (Fuel Volume is High) and (Fuel Cost is Low) then (Rank is High)

The following set of rules is applied to generators of type B:

1. If (Run Time Hours is High) then (Rank is Low)
2. If (Run Time Hours is Low) then (Rank is High)
3. If (Efficiency is Low) then (Rank is Low)
4. If (Efficiency is High) then (Rank is High)
5. If (Fuel Cost is High) then (Rank is Low)
6. If (Efficiency is High) and (Fuel Cost is Low) then (Rank is High)
7. If (Efficiency is Low) and (Fuel Cost is Low) then (Rank is Medium)
8. If (Efficiency is Medium) and (Fuel Cost is Low) then (Rank is High)
9. If (Efficiency is High) and (Fuel Cost is High) then (Rank is Medium)

The following table defines the data relevant to the ranking problem:

TABLE 5

Generator Data

| Generator | Runtime (hours) | Fuel Volume (%) | Fuel Cost ($) | Efficiency Rating |
|---|---|---|---|---|
| 1 | 143 | 98 | 0.32 | |
| 2 | 544 | 54 | 0.11 | |
| 3 | 943 | 10 | 0.45 | |
| 4 | 1023 | 99 | 0.32 | |
| 5 | 45 | 40 | 0.48 | |
| 6 | 1532 | 75 | 0.21 | |
| 7 | 223 | | 0.65 | 0.99 |
| 8 | 442 | | 0.45 | 0.54 |
| 9 | 523 | | 0.99 | 0.76 |
| 10 | 423 | | 0.23 | 0.12 |
| 11 | 654 | | 0.43 | 0.34 |
| 12 | 1320 | | 0.22 | 0.63 |

The data is then normalized to produce the following table

TABLE 6

Normalized Generator Data

| Generator | Runtime (hours) | Fuel Volume (%) | Fuel Cost ($) | Efficiency Rating |
|---|---|---|---|---|
| 1 | 0.065904506 | 1 | 0.238636364 | |
| 2 | 0.335574983 | 0.5 | 0 | |
| 3 | 0.603900471 | 0 | 0.386363636 | |
| 4 | 0.657700067 | 1.011364 | 0.238636364 | |
| 5 | 0 | 0.340909 | 0.420454545 | |
| 6 | 1 | 0.738636 | 0.113636364 | |
| 7 | 0.119704102 | | 0.613636364 | 1 |
| 8 | .266980498 | | .386363636 | .482758621 |
| 9 | .321452589 | | | .735632184 |
| 10 | .254203093 | | .136363636 | |
| 11 | 0.409549428 | | 0.363636364 | 0.252873563 |
| 12 | 0.857431069 | | 0.125 | 0.586206897 |

Running the normalized data through the fuzzy system produces the following results:

TABLE 7

Generator Ranking

| Generator | Rank | Order |
|---|---|---|
| 1 | 0.79468 | 1 |
| 2 | 0.6662 | 6 |
| 3 | 0.15745 | 12 |
| 4 | 0.5084 | 7 |
| 5 | 0.2601 | 11 |
| 6 | 0.49857 | 8 |
| 7 | 0.7547 | 3 |
| 8 | 0.7133 | 4 |
| 9 | 0.6699 | 5 |
| 10 | 0.7859 | 2 |
| 11 | 0.4141 | 10 |
| 12 | 0.4691 | 9 |

As the case with a single type of generator, the order and ranking system of the present invention has determined that generator 1 should be started and operated before any of the other 11 generators connected to the system. After generator 1, generator 10 and generator 7 should be started next. Once again, the fuzzy implication system of the present invention allows a computer controller to make a complex determination by utilizing relatively simple and understandable linguistic variables that can be set by a user. As described, the operator of the system can modify the simple linguistic rules for each of the generator types without having to adjust complex mathematical equations to compensate for the multiple inputs and multiple generator types.

Dispatch of Distributed Resources

Upon determination of the device ranking, the resources may be distributed in order of highest ranking to lowest. To perform this ranking, a computerized communications engine is utilized to send start commands to the end devices either over a local or wide area network. Once started, a generation device may be remotely monitored to determine that actual power output. Devices may be started one by one or in parallel until the power requirements have been met or there are not more available generators.

We claim:

1. A method of selectively activating a plurality of electrical devices connected to a computer network, the method comprising the steps of:

providing a computer controller in communication with the computer network, wherein the computer controller communicates to each of the electrical devices over the network;

defining a plurality of linguistic variables, each linguistic variable being related to an operating input received from the electrical devices;

defining a plurality of linguistic operating rules that each relate at least one of the linguistic variables to a consequent variable;

obtaining the operating inputs from each of the devices for each of the linguistic variables;

normalizing the operating inputs from each device connected to the computer network;

applying the normalized inputs into the operating rules to generate a ranking value for each of the devices; and activating the electrical devices in order of the ranking value.

2. The method of claim 1 wherein each of the linguistic variables and each of the consequent variables includes three membership functions, wherein each linguistic operating rule utilizes one of the three membership functions for each linguistic variable and one of the three membership functions for each of the consequent variables to generate the ranking value.

3. The method of claim 2 wherein the membership functions for the linguistic variables and the consequent variable are different.

4. The method of claim 2 wherein the step of generating the ranking value for each device includes the steps of:

applying the normalized operating input for each device to each of the linguistic operating rules to determine an area of membership;

combining the area of membership for each of the operating rules to create a solution fuzzy region F(x);

computing a composite moment from the solution fuzzy region using the equation $$z = \frac{\sum_{i=0}^{n} x_i F(x_i)}{\sum_{i=0}^{n} F(x_i)};$$

ordering the devices from the highest composite moment to the lowest composite moment; and activating the electrical devices in order from the highest composite moment to the lowest composite moment.

5. The method of claim 1 wherein each of the linguistic operating rules are "if-then" sentences.

6. A method of selectively dispatching an electrical generation system having a plurality of electrical devices connected to a computer network, the method comprising the steps of:

providing a central computer controller connected to the computer network, the computer controller being operable to selectively activate each of the electrical devices;

defining a plurality of linguistic variables, each linguistic variable being related to an operating input received from one of the electrical devices;

defining a plurality of linguistic operating rules that each relate at least one of the linguistic variables to a consequent variable;

applying the operating inputs to each operating rule and providing an overall rank of each electrical device based upon the consequent variables; and activating the electrical devices in the order of the overall rank.

7. The method of claim 6 wherein the step of ranking each electrical device utilizes "if-then" linguistic operating rules.

8. The method of claim 6 wherein the linguistic variables and the consequent variables each include at least three membership functions, wherein each linguistic operating rule utilizes one of the membership functions for each linguistic variable and each consequent variable to generate the overall rank.

9. A method of selectively activating a plurality of distributed generation systems connected to a computer network, the method comprising the steps of:

providing a computer controller in communication with the computer network, wherein the computer controller communicates to each of the generation systems over the network;

defining a plurality of linguistic variables, each linguistic variable being related to an operating input received from the generation systems;

defining a plurality of linguistic operating rules that each relate at least one of the linguistic variables to a consequent variable;

obtaining the operating inputs from each generation system for each of the linguistic variables;

normalizing the operating inputs from each generation system connected to the computer network;

entering the normalized inputs into the operating rules to generate a ranking value for each of the generation systems; and activating the generation systems in order of the ranking value.

10. The method of claim 9 wherein each of the linguistic variables and each of the consequent variables includes three membership functions, wherein each linguistic operating rule utilizes one of the three membership functions for each linguistic variable and one of the three membership functions for each of the consequent variables to generate the ranking value.

11. The method of claim 10 wherein the membership functions for the linguistic variables and the consequent variables are different.

12. The method of claim 10 wherein the step of generating the ranking value for each generation system includes the steps of:

applying the normalized operating input for each generation system to each of the operating rules to determine an area of membership;

combining the area of membership for each of the operating rules to create a solution fuzzy region $F(x)$;

computing a composite moment from the solution fuzzy region using the equation $$z = \frac{\sum_{i=0}^{n} x_i F(x_i)}{\sum_{i=0}^{n} F(x_i)};$$

ordering the generation systems from the highest composite moment to the lowest composite moment; and activating the generation systems in order from the highest composite moment to the lowest composite moment.

13. The method of claim 9 wherein each of the linguistic operating rules are "if-then" sentences.

* * * * *